(12) United States Patent
Ratcliff (10) Patent No.: US 10,931,581 B2
(45) Date of Patent: *Feb. 23, 2021

(54) MAC LEARNING IN A MULTIPLE VIRTUAL SWITCH ENVIRONMENT

(71) Applicant: International Business Machines Corporation, Armonk, NY (US)

(72) Inventor: Bruce H. Ratcliff, Red Hook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,893

(22) Filed: May 29, 2019

(65) Prior Publication Data

US 2019/0280977 A1 Sep. 12, 2019

Related U.S. Application Data

(63) Continuation of application No. 15/331,310, filed on Oct. 21, 2016.

(51) Int. Cl.
*H04L 12/28* (2006.01)
*H04L 12/743* (2013.01)
*H04L 29/12* (2006.01)
*H04L 12/751* (2013.01)
*H04L 12/721* (2013.01)
*H04L 12/931* (2013.01)

(52) U.S. Cl.
CPC .......... *H04L 45/7453* (2013.01); *H04L 45/08* (2013.01); *H04L 45/38* (2013.01); *H04L 49/70* (2013.01); *H04L 61/103* (2013.01); *H04L 61/6022* (2013.01)

(58) Field of Classification Search
CPC ....................................................... H04L 12/28
USPC ....................................................... 370/329
See application file for complete search history.

(56) References Cited

U.S. PATENT DOCUMENTS

| | | | |
|---|---|---|---|
| 9,100,274 B1 * | 8/2015 | Ghosh | H04L 49/70 |
| 9,215,129 B2 | 12/2015 | Lee et al. | |
| 9,271,311 B1 | 2/2016 | Gurney et al. | |
| 9,419,881 B2 * | 8/2016 | Haggar | H04L 61/2076 |
| 2011/0069714 A1 | 3/2011 | Le Pennec et al. | |
| 2011/0299413 A1 | 12/2011 | Chatwani et al. | |
| 2016/0043950 A1 * | 2/2016 | Vobbilisetty | H04L 45/745 370/392 |

(Continued)

OTHER PUBLICATIONS

List of IBM Patents or Patent Applictions Treated as Related; (Appendix P), Date Filed May 30, 2019, 2 pages.

(Continued)

*Primary Examiner* — Dang T Ton
(74) *Attorney, Agent, or Firm* — Cantor Colburn LLP; Steven Chiu (57) ABSTRACT

Examples of techniques for media access control (MAC) address learning are disclosed. In one example implementation according to aspects of the present disclosure, a computer-implemented method may include: receiving, by a processing device, a packet; determining, by the processing device, a packet type of the packet; and responsive to determining that the packet is a MAC learning packet type, updating, by the processing device, a MAC address table based on MAC address information associated with the packet.

19 Claims, 7 Drawing Sheets

(56) References Cited

U.S. PATENT DOCUMENTS

2016/0210218 A1 7/2016 Sun
2016/0218972 A1 7/2016 Sun
2018/0115486 A1* 4/2018 Ratcliff ............... H04L 45/7453

OTHER PUBLICATIONS

Ratcliff, "MAC Learning in a Multiple Virtual Switch Environment", U.S. Appl. No. 15/331,310, filed Oct. 21, 2016.

* cited by examiner

| Hash Index | MAC Address | Owning Host Interface ID | Hit Count | Flags |
|---|---|---|---|---|
| 1 | 07:42:77:88:99:03 | 1214 | 777 | 20 |
| 2 | 07:42:77:88:99:12 | 0007 | 12 | 10 |
| 3 | 0C:39:75:91:10:66 | 210 | 10032 | 20 |

FIG. 1

| Packet Type | Outbound/Inbound | MAC Table Action |
|---|---|---|
| ARP Request/Response | Outbound | Add Source MAC Address |
| ARP Request/Response | Inbound | Remove Destination MAC Address if present |
| IPv6 Neighbor Discovery | Outbound | Add Source MAC Address |
| IPv6 Neighbor Discovery | Inbound | Remove Destination MAC Address if present |
| Broadcast/Multicast | Outbound | Add Source MAC Address |

MAC LEARNING IN A MULTIPLE VIRTUAL SWITCH ENVIRONMENT

DOMESTIC PRIORITY

This application is a continuation of U.S. application Ser. No. 15/331,310, filed Oct. 21, 2016, the contents of which are incorporated by reference herein in its entirety.

BACKGROUND

The present disclosure generally relates to computer networks and, more particularly, relates to media access control (MAC) address learning in a multiple virtual switch environment.

Today's networks are reaching capacities of 100 gigabits (Gbs). These networks are now capable of supporting thousands of host operating systems and Hypervisors with a single physical interface. The entity controlling the physical interface needs to be flexible in the interface requirements for each host operating system and hypervisor.

SUMMARY

According to examples of the present disclosure, techniques including methods, systems, and/or computer program products for media access control (MAC) address learning are provided. An example method may include receiving, by a processing device, a packet. The method may further include determining, by the processing device, a packet type of the packet. The method may further include responsive to determining that the packet is a MAC learning packet type, updating, by the processing device, a MAC address table based on MAC address information associated with the packet.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

To enable the connectivity of multiple host operating systems and hypervisors to a single physical interface, a virtualization infrastructure is utilized to provide the multiplexing and de-multiplexing of the data streams. Some types of information which might include a MAC address, a virtual local area network (VLAN) identifier and/or internet protocol address is used to provide the multiplexing and de-multiplexing service.

A typical host operating system (OS) might want to have control of the flow of traffic on its interface. This type of interface might register its specific MAC address to the virtualization infrastructure because it only wants to send and receive traffic associated with its specific MAC Address.

On the other hand, a typical hypervisor might want to act as a virtual switch. The virtual switch may want to allocate a promiscuous type of interface where all "non-registered" traffic in the network is routed to its interface along with any specific addresses which it has "registered."

Various implementations are described below by referring to several examples of media access control (MAC) address learning in a multiple virtual switch environment. In particular, the present disclosure relates to the flow of 'non-registered' traffic and how it transitions to 'registered' traffic. This concept is known as "MAC learning" when the Ethernet MAC address is used to determine when to make the transition. In particular, MAC learning (or "bridge learning") is performed by parsing inbound and outbound packets on the physical LAN interface.

This disclosure also addresses the case where multiple virtual switches exist, each with its own specific virtual interface. For this disclosure, the MAC Learning process has also been moved out of the virtual switch and into the virtualization infrastructure. This provides a configurable entity to control the types of traffic and how the MAC learning is performed, removing the burden from the Hypervisor and/or operating system.

For traditional physical switches, the MAC learning is performed on every frame received. The source MAC address of every frame is checked to verify the MAC Address is registered to the ingress port on which the Ethernet packet was received. If the source MAC address is not present or is owned by another physical switch port, the source MAC address is then registered on the ingress port. This is a time and resource intensive process, requiring MAC learning to be performed on every frame received.

For traditional virtual switches which are executed in a Hypervisor or embedded in an operating system, the overhead of checking every frame, especially with the increased bandwidth capability of existing networks, can be significant and cause severe performance and latency impacts.

In some implementations, MAC learning in a multiple virtual switch environment as provided herein solves these existing problems. For example, by applying MAC learning when specific types of the Ethernet frames are used to determine when to make a transition from non-registered traffic to registered traffic, time and resources are saved by not performing the MAC Learning on every frame received. These and other advantages will be apparent from the description that follows.

A non-registered MAC address is determined on the inbound flow. Every inbound packet has its destination MAC address used to create a hash index. The hash index is used to search the MAC address table. If no entry is found, a "non-registered" entry is created and a copy of the packet is sent to all virtual switch interfaces defined with the "promiscuous" setting. This enables traffic to initially flow to all defined virtual switches with the promiscuous setting until the owning virtual switch replies with one of the MAC learning types of frames. This enables the communication to a server by a client prior to any connections being established. If after a defined period of time no MAC learning types of packets are sent outbound from one of the virtual switch interfaces, and no inbound traffic is received with the destination MAC address, the "non-registered" entry is removed from the table. This timeout period is a configurable value.

In another example, "stale" MAC addresses are removed from the MAC address table. Stale MAC addresses are associated with guest operating systems connected to a virtual switch for which the guest operating system has become idle or has been disconnected. In this case, the MAC address being used has become "stale" and needs to be removed from the MAC address table. To enable this feature, a timeout value is defined to cause all the "MAC learning" addresses in the MAC table to be interrogated.

To make this process more efficient, a list of "MAC learned" addresses is maintained by the virtual infrastructure. After each timeout period, the virtual infrastructure list is used to interrogate each "MAC learned" address. The hit count in the MAC address table entry (the list contains a pointer to the MAC address entry) is compared to the hit count saved from the prior timeout period. If the hit count has not changed, the entry is marked to be deleted. If the hit count has increased, the entry is considered to be active and it remains active.

Once an entry is removed, it is placed on a "pending deactivation list" for another configurable timeout period. If inbound traffic occurs for this address when the MAC address is on the pending list, the entry is reinstated back into the MAC address table for the same owning host. This enables addresses to be refreshed based on typical address resolution types of protocols, and therefore the addresses do not need to be relearned entirely. If, however, no inbound traffic is received within the pending list timeout period, the MAC address is removed from the pending list. At this point, if the address is again received in an inbound packet, it is forwarded to all virtual switches registered with the "promiscuous" setting and the MAC learning process repeats.

Example embodiments of the disclosure include or yield various technical features, technical effects, and/or improvements to technology. Example embodiments of the disclosure provide media access control (MAC) address learning by determining a packet type of the packet as one of a MAC learning packet type and a non-MAC learning packet type, and, responsive to determining that the packet is the MAC learning packet type, updating a MAC address table based on MAC address information associated with the packet. These aspects of the disclosure constitute technical features that yield the technical effect of not requiring MAC learning to be performed on every frame received. This provides the additional technical effect of reducing processing, memory, and/or network/communication resources. As a result of these technical features and technical effects, the MAC address learning in accordance with example embodiments of the disclosure represents an improvement to existing MAC address learning techniques. It should be appreciated that the above examples of technical features, technical effects, and improvements to the technology of example embodiments of the disclosure are merely illustrative and not exhaustive.

Figure 1:
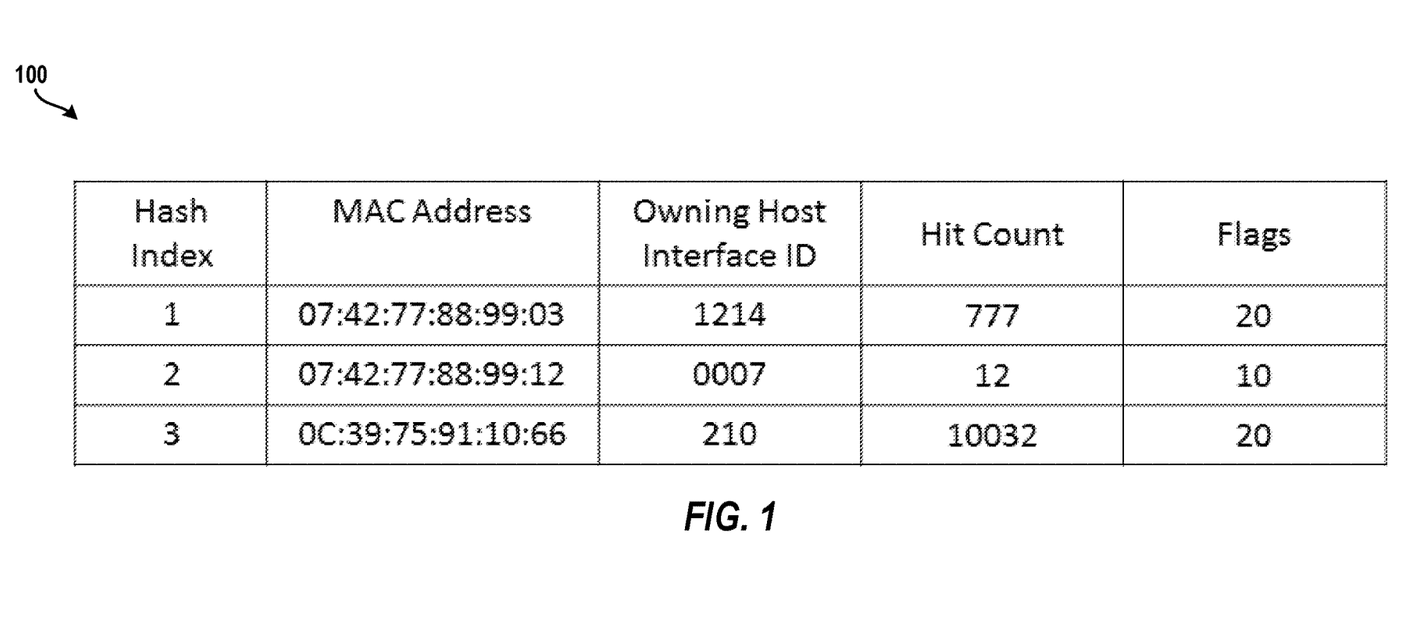
FIG. 1 illustrates a MAC address table 100 having MAC entries according to aspects of the present disclosure.

In the virtual infrastructure, a type of routing/forwarding table is necessary to provide the multiplexing and de-multiplexing of LAN traffic. FIG. 1 illustrates a MAC address table 100 having MAC entries according to aspects of the present disclosure. In the present disclosure, this forwarding table uses a MAC address to index/hash to a designated entry. Entries (i.e., MAC entries) in the MAC address table 100 are added when a MAC Address is registered or learned.

According to the example of FIG. 1, the hash index is a hash value created from the MAC address. The owning host interface ID is a value used to route/forward inbound packets to the proper owning entity. The hit count is a count of the number of times the MAC entry has been accessed. The flags indicate if the entry is active or pending and whether the entry is assigned to a Hypervisor host type.

Generally, one of two actions may a cause a MAC entry to be added in the MAC address table 100: MAC address registration and MAC learning.

MAC Address Registration is performed when a host desires to take ownership of a MAC address. This is done using a control plane primitive called SETVMAC. The SETVMAC primitive flows on the control plane owned by a specific host or Hypervisor interface. The virtualization infrastructure is able to determine the owning host interface ID from the control plane.

MAC Learning (also known as "bridge learning") is performed by parsing inbound and outbound packets on the physical LAN interface. On outbound packets, the source MAC address in the Ethernet frame is used to perform the MAC learning function.

The MAC learning function for an outbound packet executes as follows. The source MAC address is used to create a MAC address table hash index. Next, the MAC address in the MAC address table 100 is compared to the source MAC Address. There could be multiple entries assigned to the same hash index, so each entry must be checked. If a match is found, the owning host interface ID is compared to the current entry. If the owning host interface ID is different from the current entry, the owning host interface ID is updated with the value of the current entry. If no match is found, a new entry in the MAC address table 100 is created with the MAC address.

The inbound packet flows are used to determine if a MAC address has been "relocated" to a different host. In that case, the MAC address entry is removed from the MAC address table 100.

The overhead to perform the MAC learning function on every outbound and inbound packet can be significant, especially with all of the other packet processing that occurs in a virtualization infrastructure. However, there are some specific packet types which are only transmitted during host initializations and address resolutions. These specific packet types can be used to perform the MAC learning function and may be referred to as MAC learning packets. Doing so enables other packet types (i.e., packet types not of the specific packet types or non-MAC learning packets) to pass without adding the additional overhead of analyzing every packet. Accordingly, a large majority of LAN traffic flows without adding any additional overhead.

The following represent special packet types that are used to perform MAC Learning. For example, special packet types (i.e., MAC learning packet types) may include:

address resolution protocol (ARP) request packets, ARP response packets; neighbor discovery packets, and broadcast and multicast packets.

ARP Request Packets: Gratuitous ARP requests are sent during host initialization when configuring an IPv4 address. The ARP requests are used to verify that another LAN station is not assigned the same MAC address. ARP requests are sent when an IP address in the local IP subnet is trying to be reached. It correlates a MAC address to an IP address.

ARP Responses Packets: ARP response packets are generated in response to an ARP request from another LAN Station.

IPv6 Neighbor Discovery: Duplicate address detection is a type of neighbor solicitation that is sent during host initialization of an IPv6 address and is analogous to gratuitous ARP requests used for IPv4 addresses. Neighbor solicitation requests represent frames used to find the MAC address associated with an IPv6 address, which is analogous to the ARP requests used to resolve the MAC address associated with an IPv4 address. IPv6 neighbor advertisement is a type of packet generated in response to a neighbor solicitation request sent from another LAN station and is analogous to the ARP reply used for IPv4.

Broadcast and Multicast Packets: Broadcast and multicast packets are used for outbound MAC learning.

Figure 2:
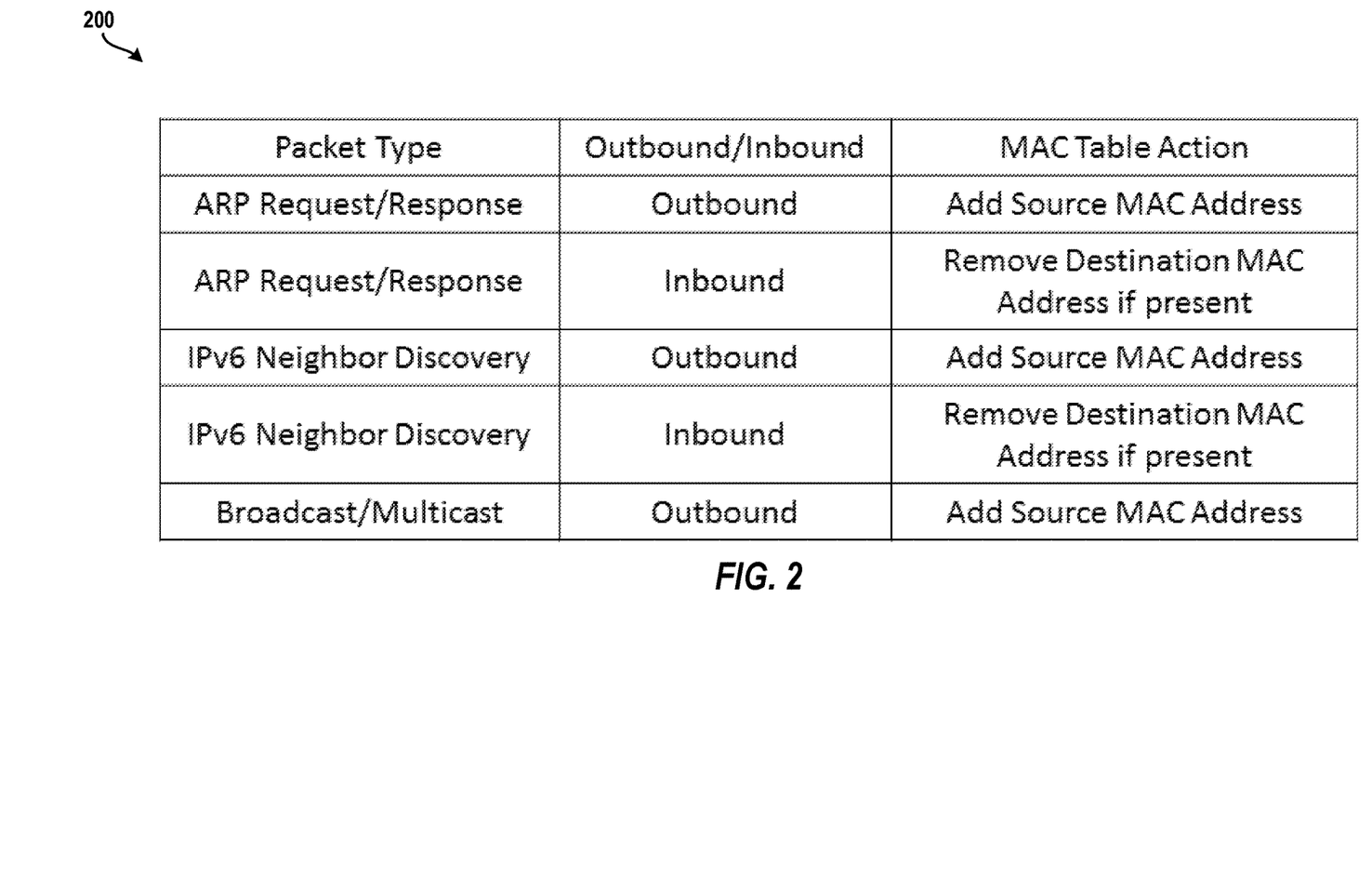
FIG. 2 illustrates a table that depicts how the special learning packets described herein affect the entries in the MAC address table of FIG. 1 according to aspects of the present disclosure.

FIG. 2 illustrates a table 200 that depicts how the special learning packets described herein affect the entries in the MAC address table 100 of FIG. 1 according to aspects of the present disclosure. In particular, the table 200 describes what MAC table action occurs for different packet types for both inbound and outbound packets. For example, for ARP requests/responses for outbound traffic, the MAC address table 100 is updated by adding a source MAC address for the ARP requests/responses. Similarly, for neighbor discovery packets for inbound traffic, the MAC address table 100 is updated to remove a destination MAC address for the neighbor discovery packet if present. These and other examples are apparent from the example of FIG. 2.

Figure 3:
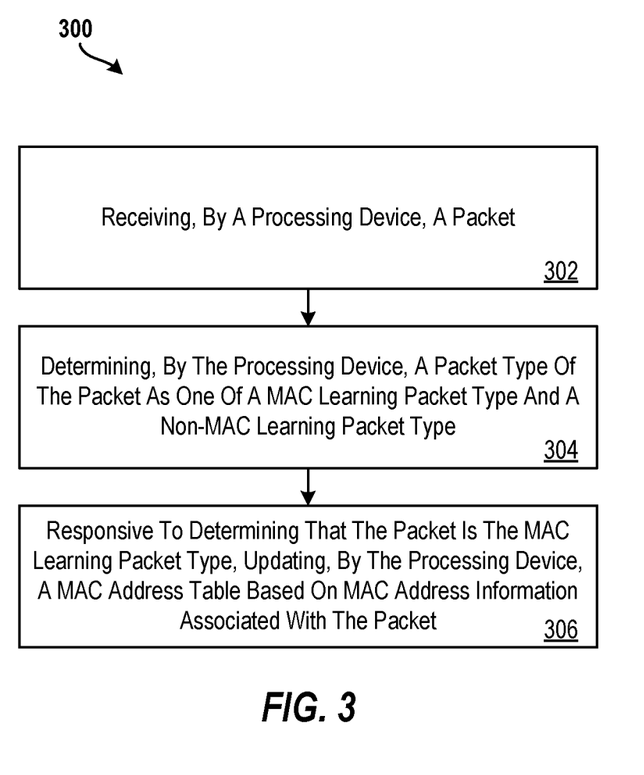
FIG. 3 illustrates a flow diagram of a method for media access control (MAC) address learning according to aspects of the present disclosure.

FIG. 3 illustrates a flow diagram of a method 300 for media access control (MAC) address learning according to aspects of the present disclosure. The method 300 may be performed by a suitable processing system, such as the processing system 20 of FIG. 5.

At block 302, the method 300 includes receiving, by a processing device (e.g., the processing system 20 of FIG. 5), a packet.

At block 304, the method 300 includes determining, by a processing device, a packet type of the packet as one of a MAC learning packet type and a non-MAC learning packet type. In examples, the MAC learning packet type is one of an address resolution (ARP) request packet type, an ARP response packet type, a neighbor discovery packet type, a broadcast packet, and a multicast packet while the non-MAC learning packet type is a type other than one of the MAC learning packet types.

At block 306, the method 300 includes responsive to determining that the packet is the MAC learning packet type, updating, by the processing device, a MAC address table based on MAC address information associated with the packet. According to aspects of the present disclosure, updating the MAC address table further includes determining whether the packet is an inbound packet or an outbound packet. Responsive to determining that the packet is an outbound packet, the method 300 may include adding, by the processor, a source MAC address to the MAC address table. Responsive to determining that the packet is an inbound packet, the method 300 may include removing, by the processor, a destination MAC address from the MAC address table.

According to one example implementation of the present disclosure, responsive to determining that the packet is an outbound packet, the method 300 may include creating, by the processor, a MAC address table hash index using a source MAC address associated with the packet. Further responsive to determining that the packet is an outbound packet, the method 300 may include comparing, by the processor, a MAC address in the MAC address table with the source MAC address. Further responsive to determining that the packet is an outbound packet, the method 300 may include, responsive to determining that the MAC address in the MAC address table matches the source MAC address, comparing, by the processor, an owning host interface identifier to a stored owning host identifier stored in the MAC address table. Further responsive to determining that the packet is an outbound packet, the method 300 may include, responsive to determining that the owning host interface identifier does not match the stored owning host identifier, updating, by the processor, the stored owning host interface identifier with the owning host interface identifier. Further responsive to determining that the packet is an outbound packet, the method 300 may include, responsive to determining that no owning host interface identifier is stored in the MAC address table, storing the owning host interface identifier in the MAC address.

Additional processes also may be included. For example, the method 300 may include, responsive to determining that the packet is the non-MAC learning packet type, transmitting, by the processor, the packet as normal without updating the MAC address table. It should be understood that the processes depicted in FIG. 3 represent illustrations, and that other processes may be added or existing processes may be removed, modified, or rearranged without departing from the scope and spirit of the present disclosure.

Figure 4:
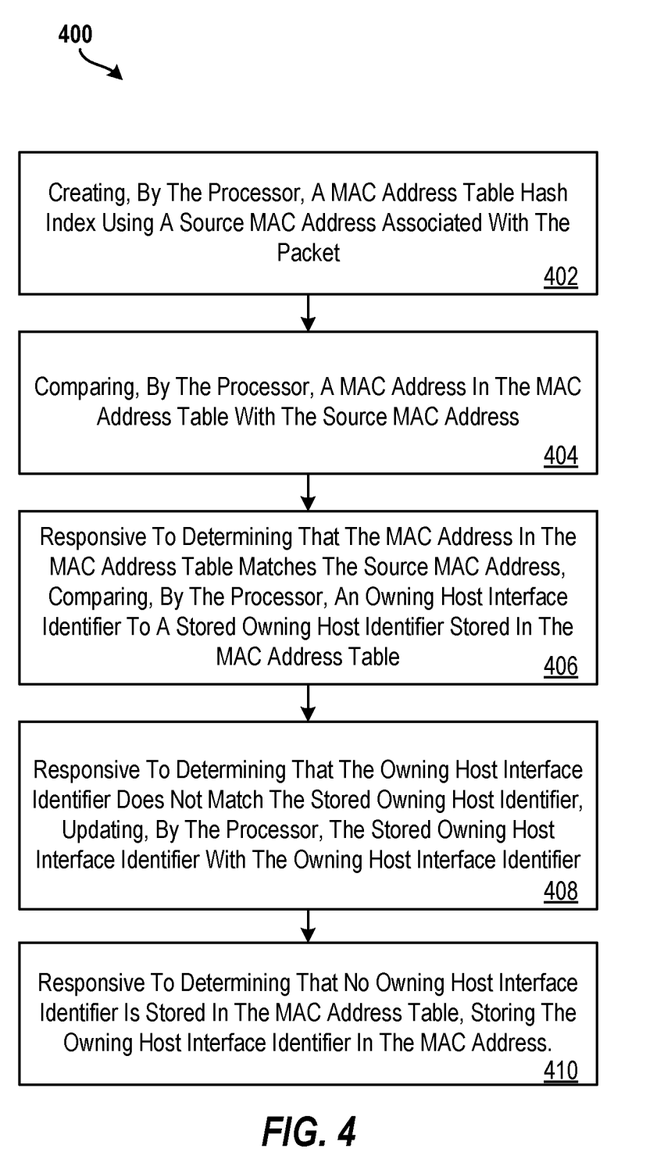
FIG. 4 illustrates a flow diagram of a method for media access control (MAC) address learning according to aspects of the present disclosure.

FIG. 4 illustrates a flow diagram of a method 400 for media access control (MAC) address learning according to aspects of the present disclosure. In particular, FIG. 4 describes source MAC address comparison to existing MAC address entries and the use of the owning host interface identifier only applies to outbound packets. The method 400 may be applied for updating a MAC address table (e.g., the MAC address table 100 of FIG. 1) for outbound packets.

At block 402, the method 400 includes creating, by the processor, a MAC address table hash index using a source MAC address associated with the packet. At block 404, the method 400 includes comparing, by the processor, a MAC address in the MAC address table with the source MAC address. At block 406, the method 400 includes responsive to determining that the MAC address in the MAC address table matches the source MAC address, comparing, by the processor, an owning host interface identifier to a stored owning host identifier stored in the MAC address table. At block 408, the method 400 includes responsive to determining that the owning host interface identifier does not match the stored owning host identifier, updating, by the processor, the stored owning host interface identifier with the owning host interface identifier. At block 410, the method 400 includes responsive to determining that no owning host interface identifier is stored in the MAC address table, storing the owning host interface identifier in the MAC address.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
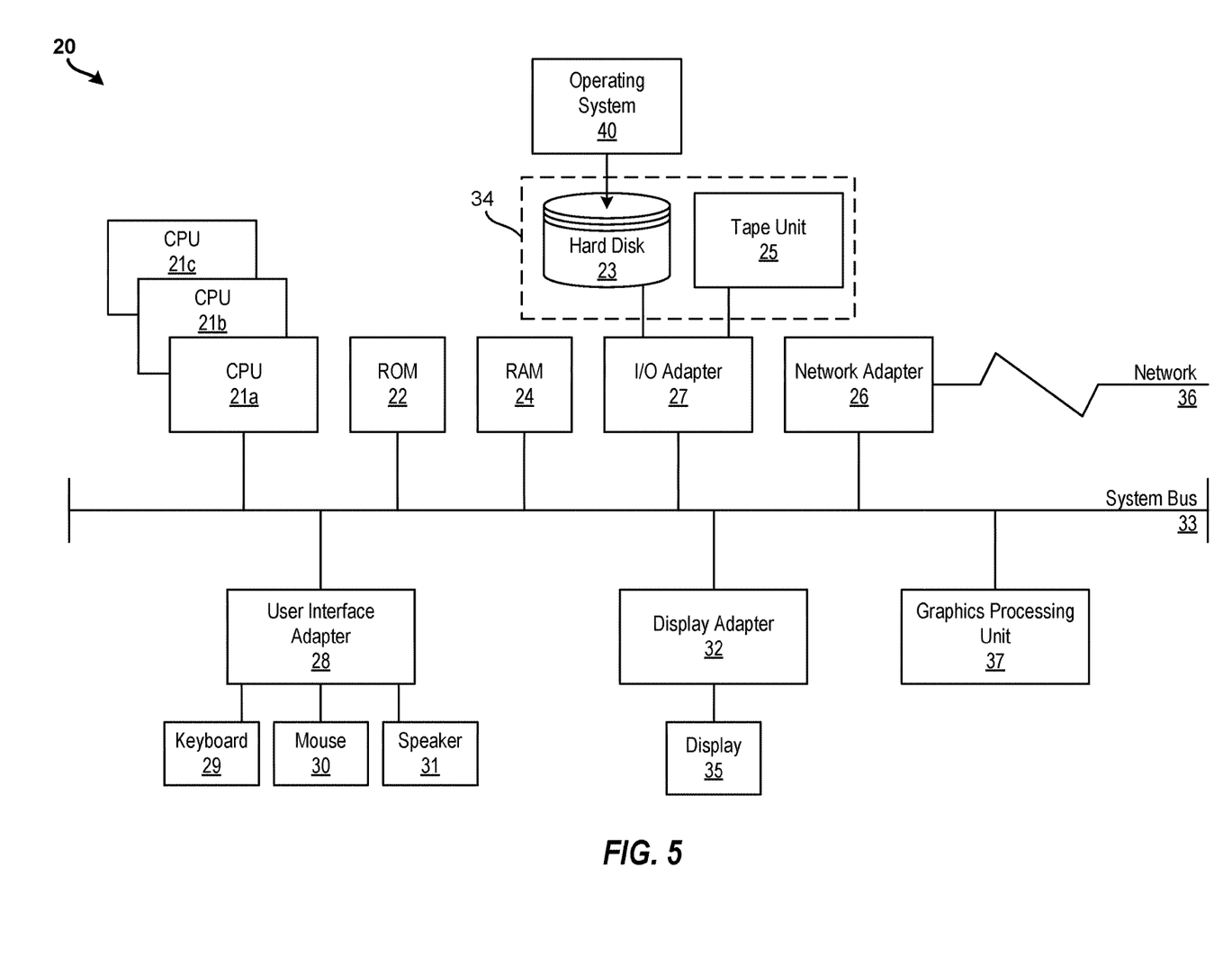
FIG. 5 illustrates a block diagram of a processing system for implementing the techniques described herein according to examples of the present disclosure.
Figure 6:
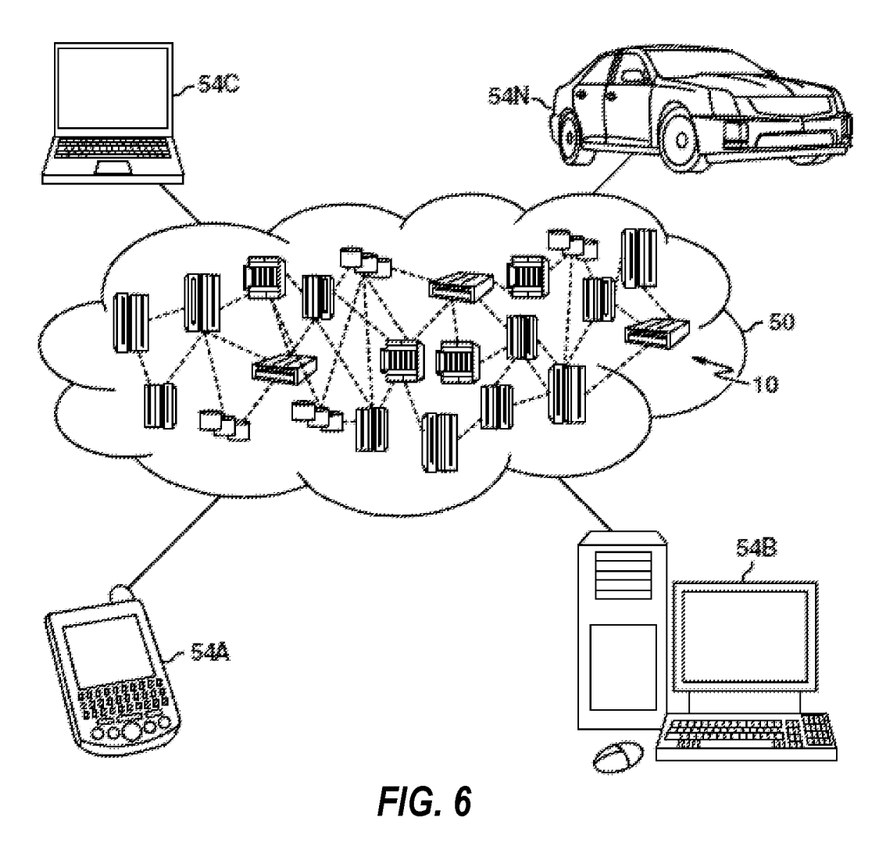
FIG. 6 illustrates a cloud computing environment according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
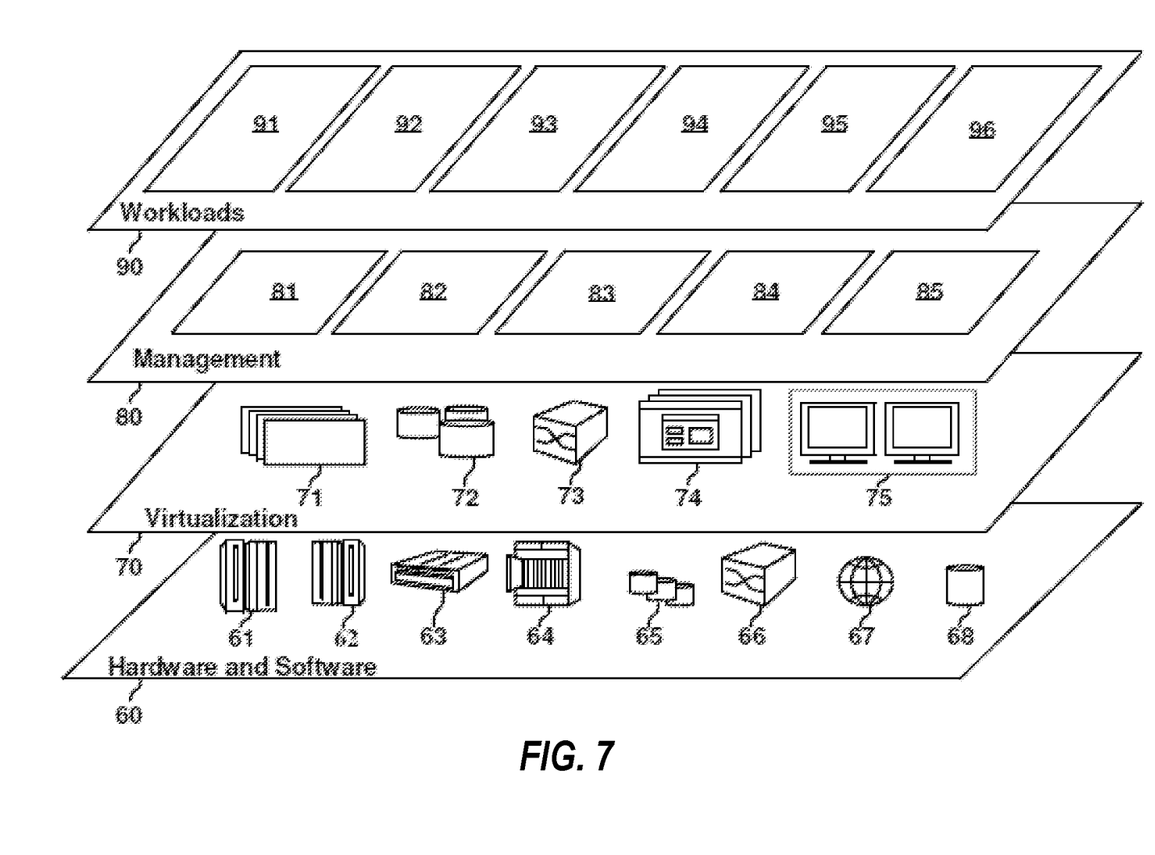
FIG. 7 illustrates abstraction model layers according to examples of the present disclosure.

Referring now to FIG. 7, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and MAC address learning 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for media access control (MAC) address learning, the method comprising:
    receiving, by a processing device, a packet;
    determining, by the processing device, a packet type of the packet;
    responsive to determining that the packet is a MAC learning packet type, updating, by the processing device, a MAC address table based on MAC address information associated with the packet;
    maintaining a list of MAC learned addresses;
    detecting a stale MAC address from the list of MAC learned addresses;
    moving the stale MAC address to a pending deactivation list for a period of time; and
    responsive to no inbound traffic being received during the period of time, removing the stale MAC address from the deactivation list.

2. The computer-implemented method of claim 1, further comprising, responsive to determining that the packet is a non-MAC learning packet type, transmitting, by the processing device, the packet without updating the MAC address table.

3. The computer-implemented method of claim 1, wherein updating the MAC address table further comprises determining whether the packet is an inbound packet or an outbound packet.

4. The computer-implemented method of claim 3, further comprising, responsive to determining that the packet is an outbound packet, adding, by the processing device, a source MAC address to the MAC address table.

5. The computer-implemented method of claim 3, further comprising, responsive to determining that the packet is an inbound packet, removing, by the processing device, a destination MAC address from the MAC address table.

6. The computer-implemented method of claim 3, further comprising, responsive to determining that the packet is an outbound packet:
creating, by the processing device, a MAC address table hash index using a source MAC address associated with the packet;
comparing, by the processing device, a MAC address in the MAC address table with the source MAC address;
responsive to determining that the MAC address in the MAC address table matches the source MAC address, comparing, by the processing device, an owning host interface identifier to a stored owning host identifier stored in the MAC address table; and
responsive to determining that the owning host interface identifier does not match the stored owning host identifier, updating, by the processing device, the stored owning host interface identifier with the owning host interface identifier.

7. The computer-implemented method of claim 6, further comprising, responsive to determining that no owning host interface identifier is stored in the MAC address table, storing the owning host interface identifier in the MAC address.

8. The computer-implemented method of claim 1, further comprising:
determining a non-registered MAC address on an inbound flow;
creating a non-registered address entry in the MAC address table;
sending a copy of the packet to a virtual switch interface defined with a promiscuous setting; and
responsive to no MAC learning packet type being received during a timeout period, removing the non-registered MAC address from the MAC address table.

9. A system for media access control (MAC) address learning, the system comprising:
a memory having computer readable instructions;
a processing device for executing the computer readable instructions, the computer readable instructions comprising:
receiving, by the processing device, a packet;
determining, by the processing device, a packet type of the packet; and
responsive to determining that the packet is a MAC learning packet type, updating, by the processing device, a MAC address table based on MAC address information associated with the packet;
maintaining a list of MAC learned addresses;
detecting a stale MAC address from the list of MAC learned addresses;
moving the stale MAC address to a pending deactivation list for a period of time; and
responsive to no inbound traffic being received during the period of time, removing the stale MAC address from the deactivation list.

10. The system of claim 9, wherein the computer readable instructions further comprise, responsive to determining that the packet is a non-MAC learning packet type, transmitting, by the processing device, the packet without updating the MAC address table.

11. The system of claim 9, wherein updating the MAC address table further comprises determining whether the packet is an inbound packet or an outbound packet.

12. The system of claim 11, wherein the computer readable instructions further comprise, responsive to determining that the packet is an outbound packet, adding, by the processing device, a source MAC address to the MAC address table.

13. The system of claim 11, wherein the computer readable instructions further comprise, responsive to determining that the packet is an inbound packet, removing, by the processing device, a destination MAC address from the MAC address table.

14. The system of claim 11, wherein the computer readable instructions further comprise, responsive to determining that the packet is an outbound packet:
creating, by the processing device, a MAC address table hash index using a source MAC address associated with the packet;
comparing, by the processing device, a MAC address in the MAC address table with the source MAC address;
responsive to determining that the MAC address in the MAC address table matches the source MAC address, comparing, by the processing device, an owning host interface identifier to a stored owning host identifier stored in the MAC address table; and
responsive to determining that the owning host interface identifier does not match the stored owning host identifier, updating, by the processing device, the stored owning host interface identifier with the owning host interface identifier.

15. The system of claim 14, wherein the computer readable instructions further comprise, responsive to determining that no owning host interface identifier is stored in the MAC address table, storing the owning host interface identifier in the MAC address.

16. A computer program product for media access control (MAC) address learning, the computer program product comprising:
a computer readable storage medium having program instructions embodied therewith, the program instructions executable by a processing device to cause the processing device to perform a method comprising:
receiving, by the processing device, a packet;
determining, by the processing device, a packet type of the packet;
responsive to determining that the packet is a MAC learning packet type, updating, by the processing device, a MAC address table based on MAC address information associated with the packet;
maintaining a list of MAC learned addresses;
detecting a stale MAC address from the list of MAC learned addresses;
moving the stale MAC address to a pending deactivation list for a period of time; and
responsive to no inbound traffic being received during the period of time, removing the stale MAC address from the deactivation list.

17. The computer program product of claim 16, wherein the method further comprises, responsive to determining that the packet is a non-MAC learning packet type, transmitting, by the processing device, the packet without updating the MAC address table.

18. The computer program product of claim 16, wherein updating the MAC address table further comprises determining that the neighbor discovery packet is an inbound packet, and responsive to determining that the neighbor discovery packet is an inbound packet, removing a destination MAC address for the neighbor discovery packet from the MAC address table if present.

19. The computer program product of claim 16, wherein updating the MAC address table further comprises determining that the neighbor discovery packet is an outbound packet, and responsive to determining that the neighbor discovery packet is an outbound packet, adding a source MAC address for the neighbor discovery packet to the MAC address table.

* * * * *